(12) United States Patent
Yu et al.

(10) Patent No.: US 11,456,950 B2
(45) Date of Patent: Sep. 27, 2022

(54) DATA FORWARDING UNIT BASED ON HANDLE IDENTIFIER

(71) Applicant: SHENYANG INSTITUTE OF AUTOMATION, CHINESE ACADEMY OF SCIENCES, Liaoning (CN)

(72) Inventors: Haibin Yu, Liaoning (CN); Peng Zeng, Liaoning (CN); Dong Li, Liaoning (CN); Zhibo Li, Liaoning (CN); Jindi Liu, Liaoning (CN); Xueting Yu, Liaoning (CN); Ming Yang, Liaoning (CN)

(73) Assignee: SHENYANG INSTITUTE OF AUTOMATION, CHINESE ACADEMY OF SCIENCES, Liaoning (CN)

( * ) Notice: Subject to any disclaimer, the term of this patent is extended or adjusted under 35 U.S.C. 154(b) by 0 days.

(21) Appl. No.: 17/041,530

(22) PCT Filed: Dec. 19, 2019

(86) PCT No.: PCT/CN2019/126587
§ 371 (c)(1),
(2) Date: Sep. 25, 2020

(87) PCT Pub. No.: WO2020/135215
PCT Pub. Date: Jul. 2, 2020

(65) Prior Publication Data
US 2021/0119908 A1    Apr. 22, 2021

(30) Foreign Application Priority Data
Dec. 25, 2018    (CN) .......................... 201811588697.3

(51) Int. Cl.
*H04L 12/725*    (2013.01)
*H04L 45/302*    (2022.01)
(Continued)

(52) U.S. Cl.
CPC ........ *H04L 45/306* (2013.01); *H04L 12/4641* (2013.01); *H04L 45/74* (2013.01)

(58) Field of Classification Search
CPC ... H04L 45/74; H04L 45/306; H04L 12/4641; H04L 12/4675; H04L 45/66
See application file for complete search history.

(56) References Cited

U.S. PATENT DOCUMENTS

2013/0259044 A1* 10/2013 Tanabe .................... H04L 45/16
370/390
2014/0081924 A1    3/2014 Jennings et al.
(Continued)

FOREIGN PATENT DOCUMENTS

CN          1972240 A       5/2007
CN        101567888 A      10/2009
(Continued)

OTHER PUBLICATIONS

International Search Report for PCT/CN2019/126587, dated Mar. 18, 2020 (4 pgs. with English translation).
(Continued)

*Primary Examiner* — Mansour Oveissi
(74) *Attorney, Agent, or Firm* — Smith, Gambrell & Russell, LLP

(57) ABSTRACT

The present invention discloses a data forwarding unit based on a Handle identifier, comprising a dynamic configuration module, a Handle identifier data identification module and a matching-forwarding module. The system of the present invention is applied to network devices such as switches and routers, and supports dynamic configuration of data packet analysis, matching and forwarding rules through data interaction with network systems such as SDN managers, so that the network devices can identify data packets based on the Handle identifier and perform the specified operation on the designated data packets with the Handle identifier according to the rules of dynamic configuration.

10 Claims, 2 Drawing Sheets

(51) Int. Cl.
   *H04L 12/46*   (2006.01)
   *H04L 45/74*   (2022.01)

(56) References Cited

U.S. PATENT DOCUMENTS

2014/0089506 A1   3/2014   Puttaswamy Naga et al.
2016/0241467 A1*  8/2016   Gunasekaran .......... H04L 45/42

FOREIGN PATENT DOCUMENTS

| CN | 102437931 A | 5/2012 |
| CN | 102739537 A | 10/2012 |
| CN | 105009529 B | 11/2018 |
| CN | 109379286 A | 2/2019 |
| CN | 107257371 B | 9/2019 |
| CN | 107181747 B | 12/2019 |

OTHER PUBLICATIONS

Written Opinion of the International Searching Authority for PCT/CN2019/126587, dated Mar. 18, 2020 (4 pgs.).
Sun, Bin et al. Record-Level Access Control Extended Handle System. Meeting of Information and Communication Network Technology Committee. Aug. 22, 2009, No. 122, (pp. 123-127), with machine translation (5 pages).
Written Opinion of the International Searching Authority (Translation), dated Mar. 18, 2021 for International Patent Application No. PCT/CN2019/126587 (4 Pages).
International Preliminary Report on Patentability dated Jun. 16, 2021 for International Patent Application No. PCT/CN2019/126587 (5 pages in Chinese; 5 pages English translation).
Chinese Office Action and Search Report dated Sep. 1, 2020 for Chinese Patent Application No. 201811588697.3 (3 pages in Chinese; 5 pages English translation).

* cited by examiner

| Destination MAC | Source MAC | VLAN label | Frame type | ...... |
|---|---|---|---|---|
| 6 BYTE | 6 BYTE | 4 BYTE | 2 BYTE | |

Fig. 3a

| 0 | 4 | 8 | 12 | 16 | 20 | 24 | 28 | 31 |
|---|---|---|---|---|---|---|---|---|

| Version number | Head length | Service type TOS | | Total length | | | |
|---|---|---|---|---|---|---|---|
| Identifier | | | | Symbol | Fragment offset | | |
| Lifetime TTL | | Upper layer protocol identifier | | Head checksum | | | |
| Source IP address | | | | | | | |
| Destination IP address | | | | | | | |
| ...... | | | | | | | |

Fig. 3b

DATA FORWARDING UNIT BASED ON HANDLE IDENTIFIER

TECHNICAL FIELD

The present invention relates to the technical field of networks, and more particularly, relates to a data forwarding unit based on a Handle identifier.

BACKGROUND

In a traditional network system, MAC address and IP address are used to address a device, wherein the MAC address is used for addressing in the subnet, and a switch performs data exchange by looking up a forwarding table; and the IP address is used for addressing between subnets. A router performs data routing through a routing table. The switch with three layers of functions can also realize the functions of the router.

The SDN exchange technology represented by OpenFlow makes flexible data forwarding possible. The OpenFlow switch can extract all the information of an MAC layer, a network layer, and a transport layer of a data packet, can forward data like the traditional switch and router according to the MAC address and the IP address, and can also forward, modify and discard the data packet according to a variety of information of the data packet and the combination of the information. However, the forwarding realized by OpenFlow is still data forwarding based on network information. Network information such as MAC and IP exists only for data forwarding, and does not have any significance to the device itself.

The Handle system is a global distributed system, and defines a set of layered service models, as well as a corresponding global analytical system and an operation and maintenance mechanism of sectional management. The Handle system provides a unique, legal, secure and permanent identifier for various entity objects on the Internet in a certain way. Through the identifier, the functions of interpretation, positioning, tracking, query and application of the identified objects can be realized. The present invention improves a network transmission device, and interacts with the configuration information of a network management system such as SDN manager to enable the network device to support the data forwarding through the Handle identifier, realize the unity of a device identifier and a communication identifier, and establish a foundation for optimal configuration of the communication of the network management system.

SUMMARY

The present invention provides a data forwarding unit based on a Handle identifier, which can be applied to a switch, a router and other network devices. Through the design of a dynamic configuration module, a Handle identification module, and a matching-forwarding module, the network device has the functions of identifying the Handle identifier and forwarding data through the Handle identifier.

The present invention adopts the following technical solution: a data forwarding unit based on a Handle identifier comprises:

a dynamic configuration module for information interaction between a network management system and a forwarding unit to complete the configuration of a Handle identifier data identification module and a matching-forwarding module of the forwarding unit;

a Handle identifier data identification module for identifying a data packet with a Handle identifier and delivering the data packet to the matching-forwarding module;

a matching-forwarding module for matching the Handle identifier with the existing matching information and forwarding the Handle identifier according to forwarding rules corresponding to a matching result.

Through the dynamic configuration module, configurable information comprises: data packet features with the Handle identifier, Handle identifier attributes and matching-forwarding rules.

The Handle identifier data identification module executes the following steps:

a layer 2 data identification submodule intercepts layer 2 data packets in the network device, compares the layer 2 data packets with the data packet features with the Handle identifier, delivers the data packets conforming to the Handle features to the matching-forwarding module, and delivers the data packets not conforming to the Handle features to the network device for processing;

a layer 3 data identification submodule intercepts layer 3 data packets in the network device, compares the layer 3 data packets with the data packet features with the Handle identifier, delivers the data packets conforming to the Handle features to the matching-forwarding module, and delivers the data packets not conforming to the Handle features to the network device for processing.

The data packet features with the Handle identifier comprise:

for an Ethernet frame type field, an Ethernet frame format field value is designated;

for an Ethernet address, an Ethernet source address or destination address value is designated;

for VLAN, a VLAN ID is designated;

for a service type, a TOS field value of a service type is designated;

for an IP data packet protocol type field, an IP data packet protocol type field value is designated;

for an IP address, an IP source address or destination address value is designated.

The layer 2 data packets are compared with the data packet features with the Handle identifier and are satisfactory when meeting at least one of the following:

the Ethernet frame type field is the same as the designated Ethernet frame format field value;

the Ethernet address is the same as the designated Ethernet source address or destination address value;

the VLAN is the same as the designated VLAN ID.

The layer 3 data packets are compared with the data packet features with the Handle identifier and are satisfactory when meeting at least one of the following:

the service type is the same as the designated TOS field value of the service type;

the IP data packet protocol type field is the same as the designated IP data packet protocol type field value;

the IP address is the same as the designated IP source address or destination address value.

The matching-forwarding module executes the following steps:

a Handle extraction submodule extracts the Handle identifier in the data packets;

a Handle matching submodule compares the Handle identifier attributes in the data packets with the Handle identifier attributes in a matching-forwarding table and finds table items matched with the attributes;

a Handle forwarding submodule forwards data according to forwarding rules of the matched table items in the Handle matching-forwarding table;

a Handle matching-forwarding table is used to store corresponding relations between the Handle identifier attributes and the forwarding rules.

The Handle identifier attributes Handle value, Handle length and Handle truncated value.

The forwarding rules comprise:

forwarding to a port: sending data through a designated port;

forwarding to a data queue: sending the data through a designated output queue;

forwarding to a matching module: delivering to the matching module for further matching;

discarding: discarding data packets.

A data forwarding method based on a Handle identifier comprises the following steps:

the dynamic configuration module completes the configuration of the Handle identifier data identification module and the matching-forwarding module of the forwarding unit;

the Handle identifier data identification module identifies a data packet with a Handle identifier and delivers the data packet to the matching-forwarding module;

the matching-forwarding module matches the Handle identifier with the existing matching information and forwards the Handle identifier according to the forwarding rules corresponding to a matching result.

The present invention has the following beneficial effects and advantages:

1. The terminal device directly uses the Handle identifier to send and receive the data, which is convenient for self-organization of services.

2. The network can obtain the Handle identifier of a communication device, and then obtain detailed attributes of the terminal device.

3. The Handle identifier of the device is used for forwarding the data; and the meaning of the data is clearer, which is convenient for QoS management of the network.

DESCRIPTION OF DRAWINGS

FIG. 3a shows Ethernet frame format fields identified by the present invention; and FIG. 3b shows IP data format fields identified by the present invention.

DETAILED DESCRIPTION

Figure 1:
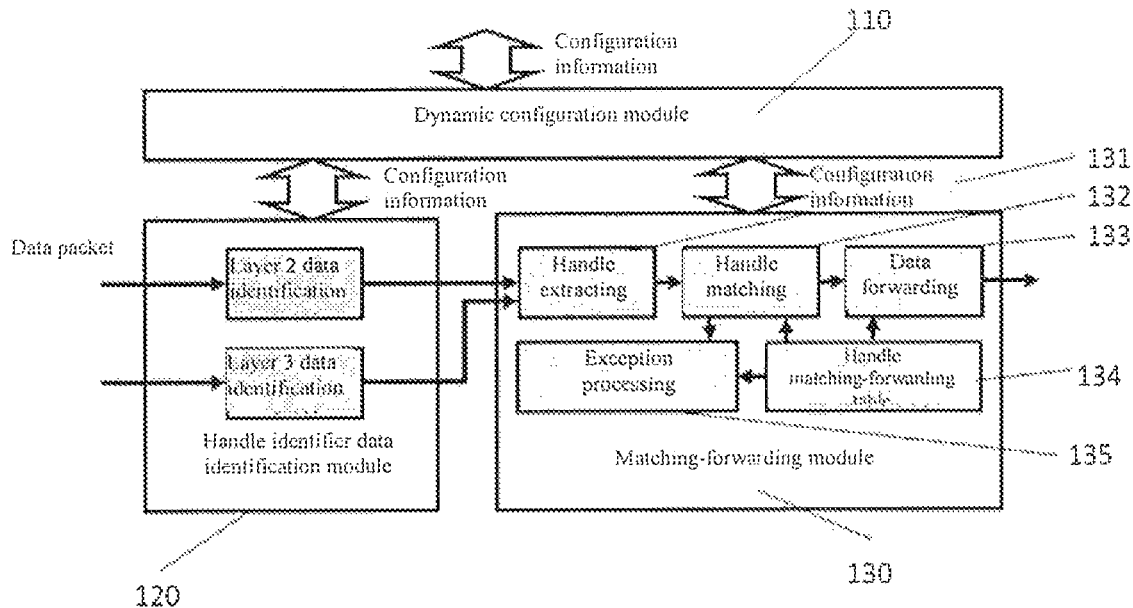
FIG. 1 is a structural schematic diagram of one embodiment of a data forwarding unit based on a Handle identifier of the present invention.

The technical solution in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

A dynamic configuration module is used for information interaction between a network management system and a forwarding unit to complete the parameter configuration and information acquisition of a Handle identifier data identification module and a matching-forwarding module of the forwarding unit.

A Handle identification module identifies a data packet with a Handle identifier and delivers the data packet to the matching-forwarding module.

A matching-forwarding module matches the Handle identifier with the existing matching information and forwards the Handle identifier according to forwarding rules corresponding to a matching result.

Through the dynamic configuration module, configurable information comprises: data packet features with the Handle identifier, specific Handle identifier attributes and matching-forwarding rules.

The data packet features with the Handle identifier comprise:

Ethernet frame type field: a data packet is identified as a data packet with a Handle identifier through a designated Ethernet frame format field value;

Ethernet address: the data packet is identified as a data packet with a Handle identifier through a designated Ethernet source address or destination address value;

VLAN: the data packet is identified as a data packet with a Handle identifier through a designated VLAN ID;

service type: the data packet is identified as a data packet with a Handle identifier through a designated TOS field value of service type;

IP data packet protocol type field: the data packet is identified as a data packet with a Handle identifier through a designated IP data packet protocol type field value;

IP address: the data packet is identified as a data packet with a Handle identifier through a designated IP source address or destination address value.

Handle identifier attributes related to forwarding comprise:

Handle value: character string or binary array with object description function;

Handle length: length of Handle field;

Handle truncated value: a certain byte, a certain segment of bytes or several bytes in the Handle value;

The matching-forwarding rules exist in pairs, and each matching-forwarding rule comprises a matching rule and a forwarding rule.

The matching rule comprises:

Handle value matching: Handle value is the same as a designated value;

Handle length matching: Handle length is the same as a designated value;

Handle truncated value matching: a certain byte or a certain segment of bytes in the Handle value is the same as a designated value.

The forwarding rule comprises:

forwarding to a port: sending data through a designated port;

forwarding to a data queue: sending the data through a designated output queue;

forwarding to a matching module: delivering to the matching module for further matching;

discarding: discarding data packets.

The Handle identification module comprises:

a layer 2 data identification submodule intercepts layer 2 data packets in the network device, compares the layer 2 data packets with the data packet features with the Handle identifier, delivers the data packets conforming to the Handle features to the matching-forwarding module, and delivers the data packets not conforming to the Handle features to the network device for conventional processing;

a layer 3 data identification submodule intercepts layer 3 data packets in the network device, compares the layer 3 data packets with the data packet features with the Handle identifier, delivers the data packets conforming to the Handle features to the matching-forwarding module, and delivers the data packets not conforming to the Handle features to the network device for conventional processing.

The layer 2 data identification submodule identifies the data packet with the Handle identifier through the following features:

Ethernet frame type field: a data packet is identified as a data packet with a Handle identifier through a designated Ethernet frame format field value;

Ethernet address: the data packet is identified as a data packet with a Handle identifier through a designated Ethernet source address or destination address value;

VLAN: the data packet is identified as a data packet with a Handle identifier through a designated VLAN ID.

The layer 3 data identification submodule identifies the data packet with the Handle identifier through the following features:

service type: the data packet is identified as a data packet with a Handle identifier through a designated TOS field value of service type;

IP data packet protocol type field: the data packet is identified as a data packet with a Handle identifier through a designated IP data packet protocol type field value;

IP address: the data packet is identified as a data packet with a Handle identifier through a designated IP source address or destination address value.

The matching-forwarding module comprises:

a Handle extraction submodule which extracts the Handle identifier in the data packets;

a Handle matching submodule which compares the Handle identifier in the data packets with the information in a matching-forwarding table, finds table items matched with the information, and delivers the Handle identifier that cannot be matched to an exception processing submodule;

a Handle forwarding submodule which forwards data according to forwarding rules of the matched table items in the matching-forwarding table;

a Handle matching-forwarding table which is a list for recording relations of the matching rules and the forwarding rules;

the exception processing submodule which feeds back exception information in the Handle matching-forwarding table and the Handle matching submodule to the network management system through the dynamic configuration module.

The Handle matching submodule can match the following Handle identifiers:

Handle value matching: Handle value is the same as a designated value;

Handle length matching: Handle length is the same as a designated value;

Handle truncated value matching: a certain byte or a certain segment of bytes in the Handle value is the same as a designated value.

The Handle forwarding submodule can perform the following operations on the data:

forwarding to a port: sending data through a designated port;

forwarding to a data queue: sending the data through a designated output queue;

forwarding to a matching module: delivering to the matching module for further matching;

discarding: discarding data packets.

The Handle matching-forwarding table records the Handle matching rules and the forwarding rules in pairs according to the configuration of the dynamic configuration module.

An exception notification module can feed back the unmatched Handle identifiers to the network management system through the dynamic configuration module.

FIG. 1 shows a structural schematic diagram of one embodiment of a data forwarding unit based on a Handle identifier of the present invention. The system comprises: a dynamic configuration module 110, a Handle identification module 120 and a matching-forwarding module 130, is characterized by comprising:

the dynamic configuration module 110 is used for information interaction between a network management system and a forwarding unit to complete the parameter configuration and information acquisition of a Handle identifier data identification module and matching-forwarding module of the forwarding unit;

the Handle identification module 120 identifies a data packet with a Handle identifier and delivers the data packet to the matching-forwarding module;

the matching-forwarding module 130 matches the Handle identifier with the existing matching information and forwards the Handle identifier according to forwarding rules corresponding to a matching result.

Through the dynamic configuration module, configurable information comprises: data packet features with the Handle identifier, specific Handle identifier attributes and matching-forwarding rules. The data packet features with the Handle identifier are used for configuration of the Handle identification module. Specific Handle identifier features and the matching-forwarding rules are the configuration of the matching-forwarding module.

Figure 2:
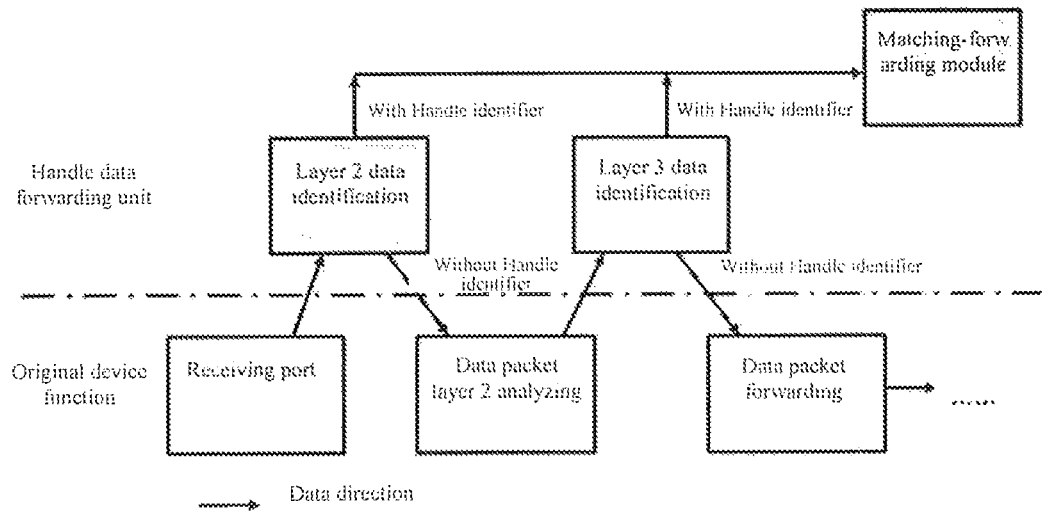
FIG. 2 is a work flow of a Handle identifier data identification module of the present invention.

FIG. 2 shows the functions of the Handle identification module of the present invention, comprising a layer 2 data identification submodule 210 and a layer 3 data identification submodule 220.

1) The layer 2 data identification submodule 210 intercepts received layer 2 data packets in the network device, compares the layer 2 data packets with the data packet features with the Handle identifier, delivers the data packets conforming to the Handle features to the matching-forwarding module, and delivers the data packets not conforming to the Handle features to the network device for conventional processing;

2) The layer 3 data identification submodule 220 intercepts processed IP data packets in the network device, compares the data packets with the data packet features with the Handle identifier, delivers the data packets conforming to the Handle features to the matching-forwarding module, and delivers the data packets not conforming to the Handle features to the network device for conventional processing.

As shown in FIG. 3a, the layer 2 data identification submodule identifies the data packet with the Handle identifier through the following features:

1) Ethernet frame type field: the data packet is identified as a data packet with a Handle identifier through a designated Ethernet frame format field value;

2) Ethernet address: the data packet is identified as a data packet with a Handle identifier through a designated Ethernet source address or destination address value;

3) VLAN: the data packet is identified as a data packet with a Handle identifier through a designated VLAN ID.

As shown in FIG. 3b, the layer 2 data identification submodule identifies the data packet with the Handle identifier through the following features:

1) service type: the data packet is identified as a data packet with a Handle identifier through a designated TOS field value of service type;

2) IP data packet protocol type field: the data packet is identified as a data packet with a Handle identifier through a designated IF data packet protocol type field value;

3) IP address: the data packet is identified as a data packet with a Handle identifier through a designated IP source address or destination address value.

As shown in FIG. 1, the matching-forwarding module comprises:

1) a Handle extraction submodule 131 which extracts the Handle identifier in the data packets;

2) a Handle matching submodule 132 which compares the Handle identifier in the data packets with the information in a matching-forwarding table, finds table items matched with the information, and delivers the Handle identifier that cannot be matched to an exception processing submodule;

4) a Handle forwarding submodule 133 which forwards data according to forwarding rules of the matched table items in the matching-forwarding table;

5) a Handle matching-forwarding table 134 which is a list for recording relations of the matching rules and the forwarding rules;

6) the exception processing submodule 135 which feeds back exception information in the Handle matching-forwarding table and the Handle matching submodule to the network management system through the dynamic configuration module.

The Handle matching submodule in the matching-forwarding module can match the following Handle identifier attributes:

1) Handle value matching: Handle value is the same as a designated value;

2) Handle length matching: Handle length is the same as a designated value;

3) Handle truncated value matching: a certain byte or a certain segment of bytes in the Handle value is the same as a designated value.

The Handle forwarding submodule in the matching-forwarding module can perform the following operations on the data:

1) forwarding to a port: sending data through a designated port;

2) forwarding to a data queue: sending the data through a designated output queue;

3) forwarding to a matching module: delivering to the matching module for further matching;

4) discarding: discarding data packets.

The matching-forwarding table in the matching-forwarding module records the Handle matching rules and the forwarding rules in pairs according to the configuration of the dynamic configuration module.

An exception notification module in the matching-forwarding module can feed back the unmatched Handle identifiers to the network management system through the dynamic configuration module.

The invention claimed is:

1. A data forwarding unit, comprising:
a dynamic configuration module configured for dynamically configuring a Handle identification module and a matching-forwarding module;
the Handle identification module configured for identifying Handle identifiers in data packets, and delivering data packet packets based on the identification of a Handle identifier, wherein;
the matching-forwarding module configured for matching the Handle identifiers of data packets with stored Handle identifiers, identifying forwarding rules corresponding to matched Handle identifiers, and forwarding data according to the identified forwarding rules, wherein
the Handle identification module comprises:
a layer 2 data identification submodule configured to intercept layer 2 data packets received at a receiving port of a network device, identify Handle identifiers in the layer 2 data packets based on a first set of Handle identifier attributes, and delivering to the matching-forwarding module those data packets that are determined to have Handle identifiers conforming to the first set of Handle identifier attributes, and
a layer 3 data identification submodule configured to intercept layer 3 data packets that have been processed in the network device, identify Handle identifiers in the layer 3 data packets based on a second set of Handle identifier attributes, and delivering to the matching-forwarding module those data packets that are determined to have Handle identifiers conforming to the second set of Handle identifier attributes.

2. The data forwarding unit according to claim 1, wherein the dynamic configuration module is configured for dynamically configuring the Handle identification module and the matching-forwarding module with configurable information that comprises: data packet features for data packets having a Handle identifier, Handle identifier attributes, matching rules, and forwarding rules.

3. The data forwarding unit according to claim 1, wherein the Handle identification module is configured such that data packets that are determined to not conform with Handle identifier attributes are delivered to the network device for processing.

4. The data forwarding unit according to claim 1, wherein the Handle identification module is configured to identify a data packet as having a Handle identifier based on data packet features that comprise at least one of: an Ethernet frame type field; an Ethernet address; a virtual local area network identification (VLAN ID); a type of service (TOS) field; an IP data packet protocol type field; and an IP address.

5. The data forwarding unit according to claim 1, wherein the layer 2 identification submodule is configured to determine if layer 2 data packets have a Handle identifier by comparing data packet features of the layer 2 data packets with stored data packet features comprising at least one of: an Ethernet frame format field; an Ethernet address; and a virtual local area network identification (VLAN ID).

6. The data forwarding unit according to claim 1, wherein the layer 3 identification submodule is configured to determine if layer 3 data packets have a Handle identifier by comparing data packet features of the layer 3 data packets with stored data packet features comprising at least one of: a type of service (TOS) field; an IP data packet protocol type field; and an IP address.

7. The data forwarding unit according to claim 1, wherein the matching-forwarding module comprises:
- a Handle extraction submodule configured to extract Handle identifiers in data packets;
- a Handle matching submodule configured to compare Handle identifier attributes in data packets with stored Handle identifier attributes, and to identify forwarding rules corresponding with matched Handle identifier attributes;
- a Handle forwarding submodule configured to forward data from data packets according to identified forwarding rules; and
- a Handle matching-forwarding table storing Handle identifier attributes and corresponding forwarding rules.

8. The data forwarding unit according to claim 1, wherein the Handle identification module is configured to determine if Handle identifiers of data packets correspond with stored Handle identifiers by comparing at least one of the following Handle identifier attributes: Handle value, Handle length, and Handle truncated value.

9. The data forwarding unit according to claim 1, wherein the matching-forwarding module is configured to forward data in accord with the following forwarding rules:
- forwarding data for sending through a designated port;
- forwarding data for sending through a designated output queue;
- forwarding data to a matching module for further matching; and
- discarding data.

10. A method of forwarding data, utilizing the data forwarding unit according to claim 1, comprising:
- employing the Handle identification module to identify and deliver data packets having Handle identifiers to the matching-forwarding module;
- employing the matching-forwarding module to match Handle identifiers in data packets to stored Handle identifiers, identify forwarding rules corresponding to matched Handle identifiers, and forward data based on identified forwarding rules.

* * * * *